US011572170B2

(12) United States Patent
Dowty et al.

(10) Patent No.: US 11,572,170 B2
(45) Date of Patent: Feb. 7, 2023

(54) AIRCRAFT INTERIOR STRUCTURE INCLUDING ACTUATABLE PANELS AND A FOOTWELL

(71) Applicant: B/E AEROSPACE, INC., Winston-Salem, NC (US)

(72) Inventors: Mark B. Dowty, Rural Hall, NC (US); Daniel N. Moe, Mukilteo, WA (US); Jefferey M. McKee, Duvall, WA (US); Shawn W. Raybell, Maple Valley, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 91 days.

(21) Appl. No.: 16/934,385

(22) Filed: Jul. 21, 2020

(65) Prior Publication Data
US 2022/0024591 A1 Jan. 27, 2022

(51) Int. Cl.
*B64D 11/00* (2006.01)
*B64D 11/06* (2006.01)

(52) U.S. Cl.
CPC ............ *B64D 11/00* (2013.01); *B64D 11/003* (2013.01); *B64D 11/0602* (2014.12); *B64D 11/0641* (2014.12); *B64D 11/0691* (2014.12)

(58) Field of Classification Search
CPC . B64D 11/00; B64D 11/0602; B64D 11/0641; B64D 11/0691; B64D 11/003;
(Continued)

(56) References Cited

U.S. PATENT DOCUMENTS 4,913,487 A * 4/1990 Breckel ............ B64D 11/00155
297/14
8,167,244 B2 5/2012 Johnson et al.
(Continued)

FOREIGN PATENT DOCUMENTS

DE 102008039635 A1 * 3/2010 ............. B61D 31/00
DE 102011116519 A1 * 4/2013 ......... B64D 11/0691
(Continued)

OTHER PUBLICATIONS

Collins Aerospace, "Collins Aerospace new M-FlexTM Duet monument adds new service possibilities without sacrificing seat count", https://www.collinsaerospace.com/en/newsroom/News/2019/04/collins-new-m-flex-duet-monument-adds-new-service-possibilities-wo-sacrificing-seat-count, Accessed May 1, 2020, 3 pages.
(Continued)

*Primary Examiner* — Joshua J Michener
*Assistant Examiner* — Ryan Andrew Yankey
(74) *Attorney, Agent, or Firm* — Suiter Swantz pc llo

(57) ABSTRACT

An aircraft interior structure may include a primary monument, an auxiliary monument, and a passenger seating section. The primary monument may include one or more storage compartments and a primary panel configured to actuate between a primary panel stowed position and a primary panel deployed position. The auxiliary monument may be spaced a select distance from the primary monument across a floor area of an aircraft cabin, and may include an auxiliary panel configured to actuate between an auxiliary panel stowed position and an auxiliary panel deployed position. The passenger seating section may include a footwell at least partially within the primary monument and proximate to the one or more storage compartments. The footwell may correspond to an aircraft seat. The aircraft seat may be configured to form a bed surface with at least a
(Continued)

portion being within the footwell when the aircraft seat is in a lie-flat position.

15 Claims, 14 Drawing Sheets

(58) Field of Classification Search
 CPC ........ B64D 11/0639; B64D 2011/0046; B64D 11/0643
 See application file for complete search history.

(56) References Cited

U.S. PATENT DOCUMENTS

| | | | |
|---|---|---|---|
| 10,232,942 B2 | 3/2019 | McKee | |
| 10,293,941 B2 | 5/2019 | Moran | |
| 10,336,455 B2 | 7/2019 | McIntosh et al. | |
| 10,442,535 B2 | 10/2019 | McKee | |
| 2009/0243358 A1* | 10/2009 | Henshaw | B64D 11/0601 297/340 |
| 2012/0248245 A1* | 10/2012 | Schliwa | B61D 37/006 244/118.5 |
| 2013/0187000 A1* | 7/2013 | Godecker | B64D 11/0007 244/118.5 |
| 2016/0272323 A1* | 9/2016 | Carlioz | B64D 11/0604 |
| 2017/0259921 A1* | 9/2017 | Valdes De La Garza | B64D 11/0606 |
| 2017/0283059 A1* | 10/2017 | McKee | B64D 11/003 |
| 2018/0148175 A1 | 5/2018 | Savian et al. | |
| 2018/0273182 A1 | 9/2018 | Savian et al. | |
| 2019/0308728 A1* | 10/2019 | McKee | B64D 11/0007 |
| 2019/0329890 A1 | 10/2019 | Johnson et al. | |
| 2019/0337623 A1* | 11/2019 | Vaninetti | B64D 11/0691 |
| 2022/0009634 A1* | 1/2022 | Vaninetti | B64D 11/04 |

FOREIGN PATENT DOCUMENTS

| | | | | |
|---|---|---|---|---|
| EP | 2724938 A1 * | 4/2014 | ......... | B64D 11/0691 |
| EP | 2808255 A2 * | 12/2014 | ............. | B64D 11/00 |
| EP | 3248875 A1 * | 11/2017 | ............... | A47C 9/00 |
| WO | WO-2014071335 A1 * | 5/2014 | ............. | B64D 11/00 |

OTHER PUBLICATIONS

Magnusson, Ari, Aim Altitude, "AIM Altitude Develops Front Row Monuments for China Southern Dreamliner Cabins", https://apex.aero/2019/07/19/aim-alitude-develops-front-row-monuments-china-southern, APEX, Jul. 19, 2019, 6 pages.

Gavine, Adam, "Front-row monument innovation", https://www.aircraftinteriorsinternational.com/image-galleries/front-row-monument-innovation.html, Amphenol Air LB, May 3, 2018, 3 pages.

"Front Row Monument", Feb. 23, 2018 (Feb. 23, 2018), pp. 1-2, XP055863886, Retrieved from the Internet: URL: https://www.diehl.com/cms/files/Front-Row-Monument Online-2018.pdf.

EP Search Report for European Application No. 21184813.0 dated Dec. 3, 2021, 19 pages.

Gavine Adam: "China Southern collaborates for custom B787 front row monuments—Aircraft Interiors International", Aircraft Interiors International, Jul. 18, 2019 (Jul. 18, 2019), pp. 1-4, XP055863865, Retrieved from the Internet: URL: https://www.aircraftinteriorsinternational.com/news/galleys-monuments/china-sout hern-collaborates-for-custom-b787-front-ro w-monuments.html.

* cited by examiner

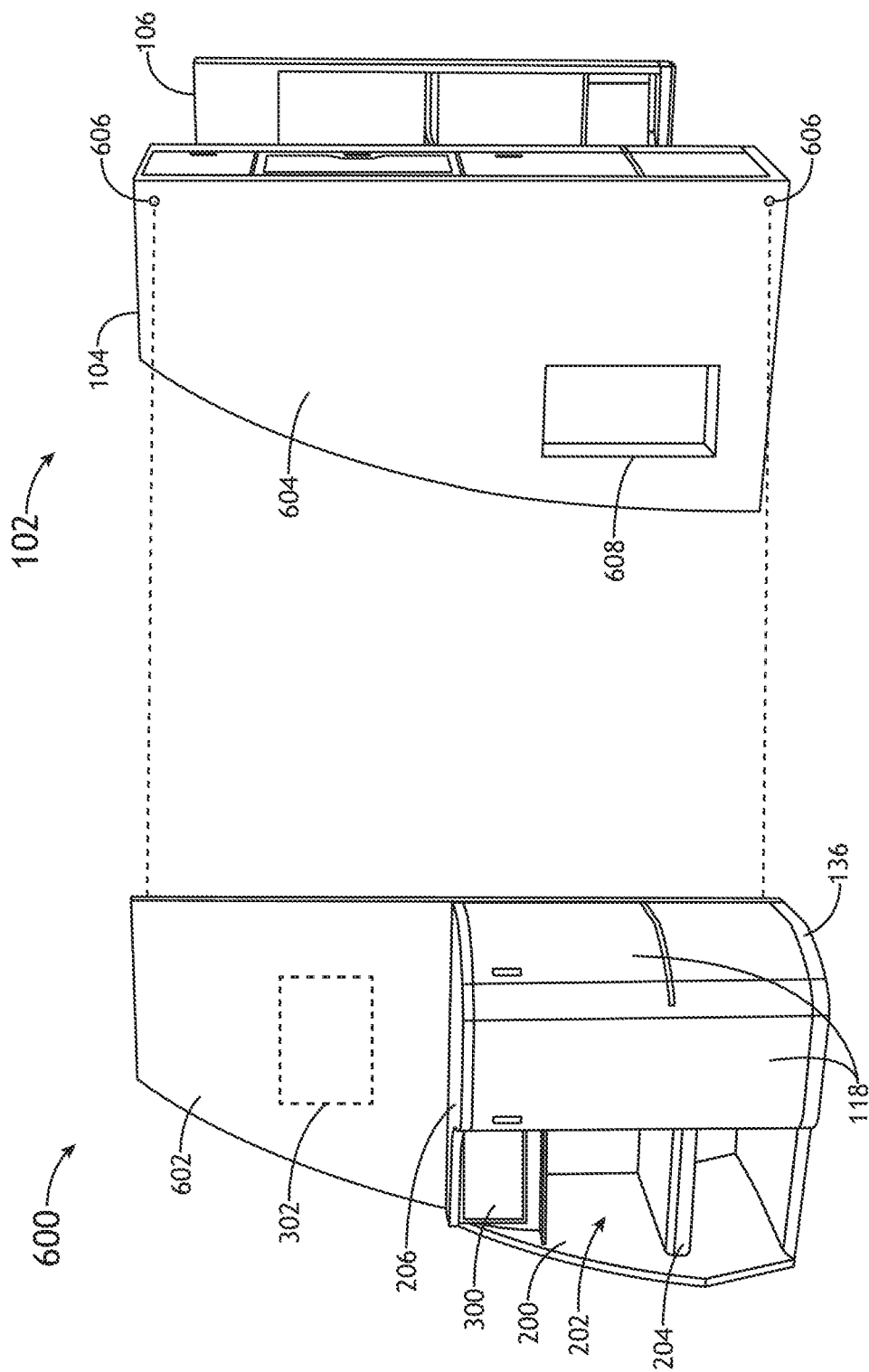

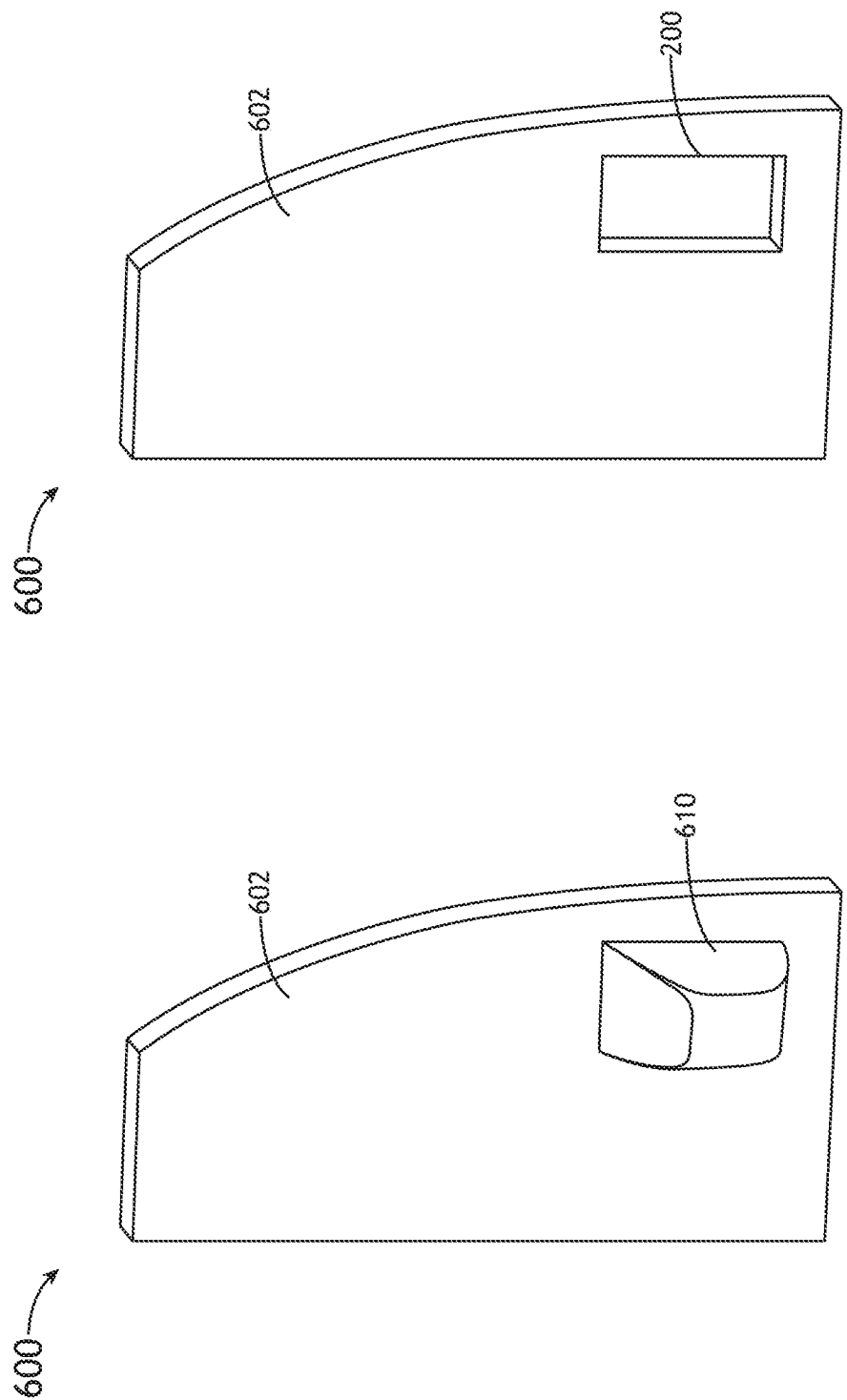

AIRCRAFT INTERIOR STRUCTURE INCLUDING ACTUATABLE PANELS AND A FOOTWELL

BACKGROUND

Aircraft cabin designs may include aircraft interior structures that are separately-constructed and separately-installed within the aircraft cabin. The separate nature of the aircraft interior structures may result in a loss of valuable space (e.g., floor space, stowage space, or the like) within the aircraft cabin.

SUMMARY

An aircraft interior structure is disclosed, in accordance with one or more embodiments of the disclosure. The aircraft interior structure may include a primary monument. The primary monument may include a primary panel and one or more storage compartments. The primary panel may be configured to actuate between a primary panel stowed position and a primary panel deployed position. The aircraft interior structure may include an auxiliary monument spaced a select distance from the primary monument across a floor area of an aircraft cabin. The auxiliary monument may include an auxiliary panel. The auxiliary panel may be configured to actuate between an auxiliary panel stowed position and an auxiliary panel deployed position. The aircraft interior structure may include a passenger seating section proximate to a passenger compartment. The passenger seating section may include a footwell. The footwell may be at least partially within the primary monument and proximate to the one or more storage compartments. The footwell may correspond to an aircraft seat within the passenger compartment. The aircraft seat may be configured to form a bed surface when the aircraft seat is in a lie-flat position. At least a portion of the bed surface may be within the footwell when the aircraft seat is in the lie-flat position.

In some embodiments, the aircraft interior structure may include a service area formed from at least one actuatable shelf. The at least one actuatable shelf may be coupled at least one of the primary panel or the auxiliary panel. The service area may be configured to actuate between a service area stowed position and a service area deployed position.

In some embodiments, the at least one actuatable shelf may include a primary shelf coupled to the primary panel and an auxiliary shelf coupled to an auxiliary panel. The service area may be in the service area stowed position when the primary panel is in the primary panel stowed position and the auxiliary panel is in the auxiliary panel stowed position.

In some embodiments, the aircraft interior structure may include at least one crew member aircraft seat coupled to at least one of the primary panel or the auxiliary panel. The at least one crew member aircraft seat may be configured to actuate between a crew member aircraft seat stowed position and a crew member aircraft seat deployed position.

In some embodiments, the at least one crew member aircraft seat may include a primary crew member aircraft seat coupled to the primary panel and an auxiliary crew member aircraft seat coupled to the auxiliary panel. The primary crew member aircraft seat and the auxiliary crew member aircraft seat may be accessible when the primary panel is in the primary panel stowed position and the auxiliary panel is in the auxiliary panel stowed position. The primary crew member aircraft seat and the auxiliary crew member aircraft seat may be inaccessible when the primary panel is in the primary panel deployed position and the auxiliary panel is in the auxiliary panel deployed position.

In some embodiments, the primary crew member aircraft seat and the auxiliary crew member aircraft seat may be actuatable between the crew member aircraft seat stowed position and a crew member aircraft seat deployed position when the primary panel is in the primary panel stowed position and the auxiliary panel is in the auxiliary panel stowed position.

In some embodiments, the auxiliary panel may be configured to be in the auxiliary panel stowed position when the primary panel is in the primary panel stowed position. The auxiliary panel may be configured to be in the auxiliary panel deployed position when the primary panel is in the primary panel deployed position.

In some embodiments, the footwell may be configured to fit in a space within the primary monument at least partially defined by a depth of the one or more storage compartments.

In some embodiments, the primary monument and the auxiliary monument may be separated by a floor area within an aircraft cabin including the aircraft interior structure.

In some embodiments, the one or more storage compartments may be accessible from at least one of the floor area of the aircraft cabin when the primary panel is in the primary deployed position or an aircraft aisle of the aircraft cabin.

In some embodiments, the floor area may lead to an egress point of the aircraft cabin. The primary monument and the auxiliary monument may flank the egress point of the aircraft cabin. The primary panel and the auxiliary panel may provide access to the egress point when the primary panel is in the primary panel stowed position and the auxiliary panel is in the auxiliary panel stowed position.

In some embodiments, the passenger seating section may include an ottoman within the footwell. The ottoman may correspond to the aircraft seat within the passenger compartment. The ottoman and the aircraft seat may be configured to form the bed surface when the aircraft seat is in the lie-flat position.

An aircraft interior structure is disclosed, in accordance with one or more embodiments of the disclosure. The aircraft interior structure may include a primary monument. The primary monument may include a primary panel and one or more storage compartments. The primary panel may be configured to actuate between a primary panel stowed position and a primary panel deployed position. The aircraft interior structure may include an auxiliary monument spaced a select distance from the primary monument across a floor area of an aircraft cabin. The auxiliary monument may include an auxiliary panel. The auxiliary panel may be configured to actuate between an auxiliary panel stowed position and an auxiliary panel deployed position. The aircraft interior structure may include a façade with a passenger seating section proximate to a passenger compartment. The façade may be couplable to a surface of the primary monument facing the passenger compartment. The passenger seating section may include an opening configured to provide access to a footwell. The footwell may be at least partially within the primary monument and proximate to the one or more storage compartments. The footwell may correspond to an aircraft seat within the passenger compartment. The aircraft seat may be configured to form a bed surface when the aircraft seat is in a lie-flat position. At least a portion of the bed surface being within the footwell when the aircraft seat is in the lie-flat position.

In some embodiments, the façade may include the footwell and the opening configured to provide access to the footwell. The surface of the primary monument may include a cavity configured to receive an extended portion of the façade corresponding to the footwell.

In some embodiments, the façade may include the opening configured to provide access to the footwell. The surface of the primary monument may include a cavity configured to operate as the footwell.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 6A illustrates a perspective view of a faceplate for an aircraft interior structure with actuatable panels and a footwell, in accordance with one or more embodiments of the disclosure;

FIG. 6B illustrates a perspective view of an aircraft interior structure with actuatable panels and a footwell, in accordance with one or more embodiments of the disclosure;

FIG. 6C illustrates a perspective view of a faceplate for an aircraft interior structure with actuatable panels and a footwell, in accordance with one or more embodiments of the disclosure; and FIG. 6D illustrates a perspective view of a faceplate for an aircraft interior structure with actuatable panels and a footwell, in accordance with one or more embodiments of the disclosure.

DETAILED DESCRIPTION OF THE INVENTION

Figure 1A:
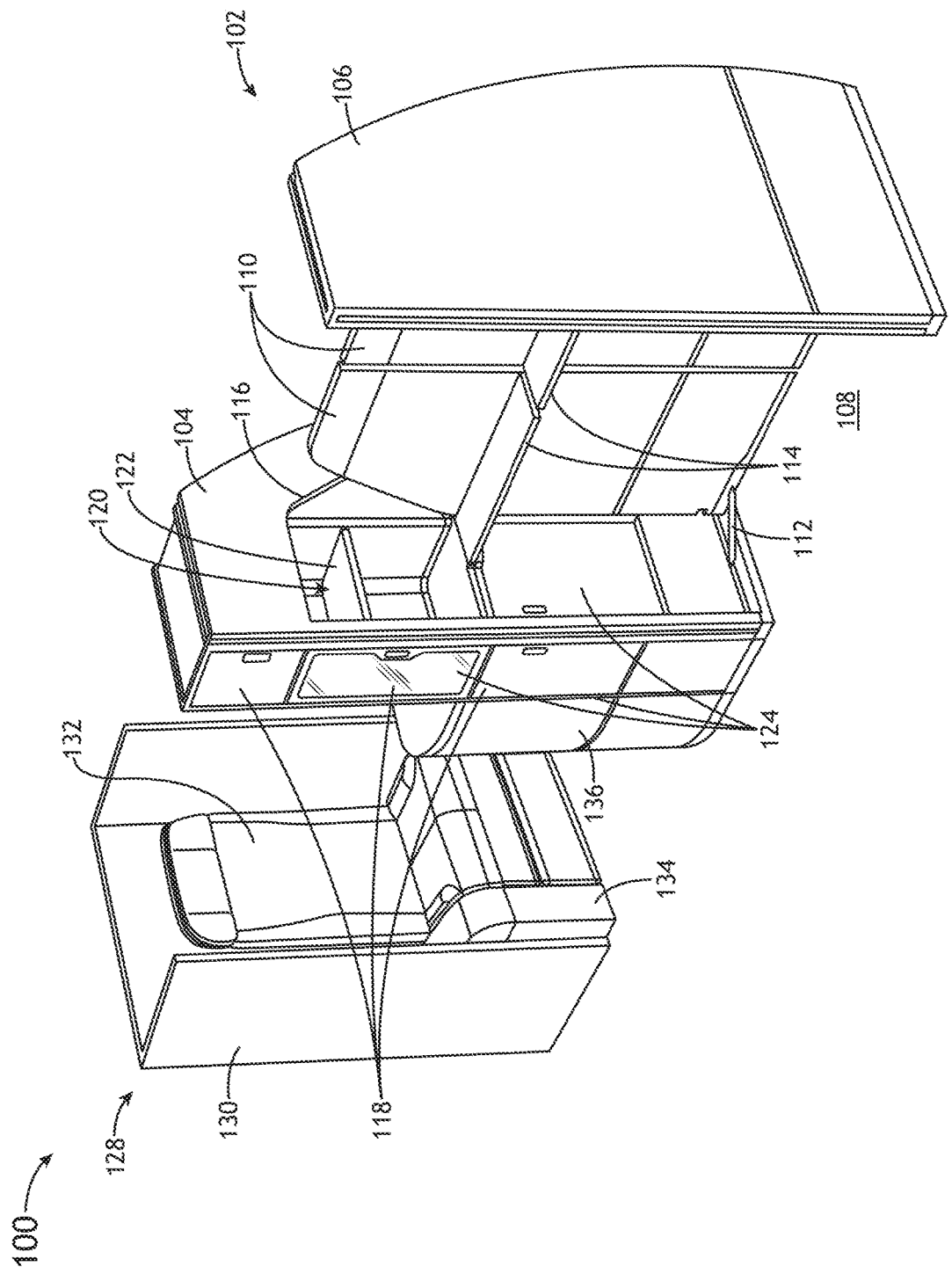
FIG. 1A illustrates a perspective view of an aircraft cabin including a passenger compartment and an aircraft interior structure with actuatable panels, in accordance with one or more embodiments of the disclosure.
Figure 1B:
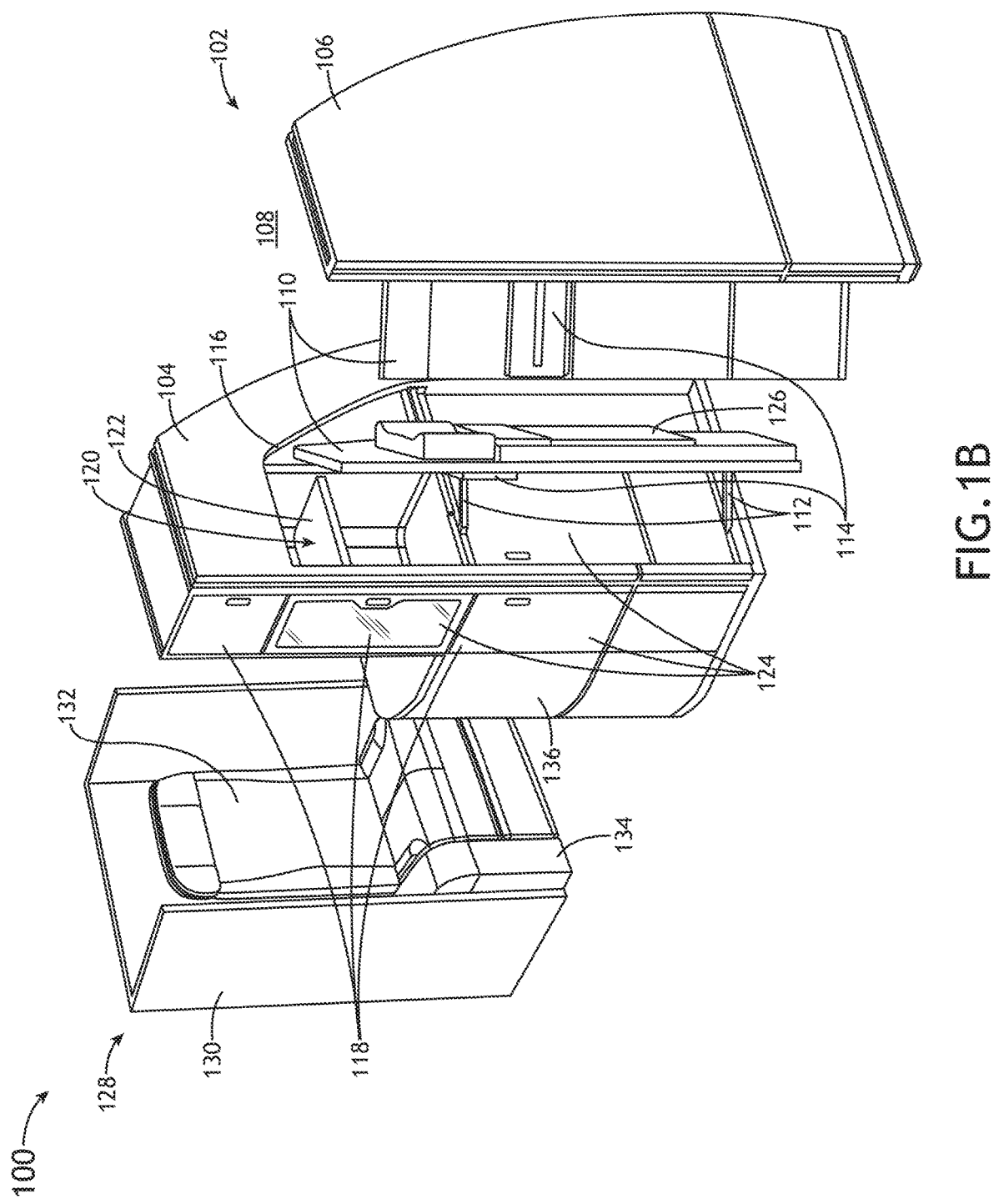
FIG. 1B illustrates a perspective view of an aircraft cabin including a passenger compartment and an aircraft interior structure with actuatable panels, in accordance with one or more embodiments of the disclosure.
Figure 1C:
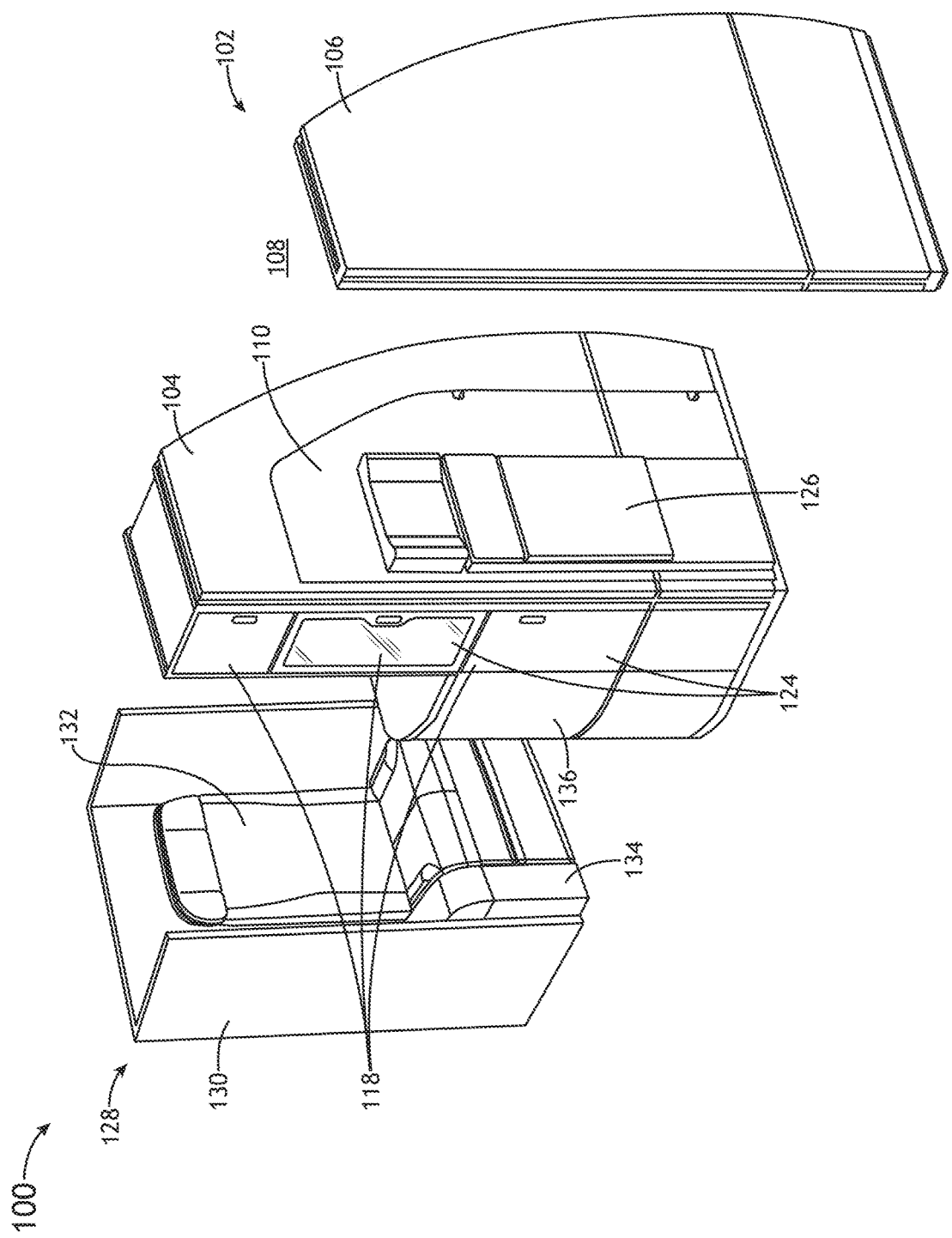
FIG. 1C illustrates a perspective view of an aircraft cabin including a passenger compartment and an aircraft interior structure with actuatable panels including a deployable crew member aircraft seat, in accordance with one or more embodiments of the disclosure.
Figure 1D:
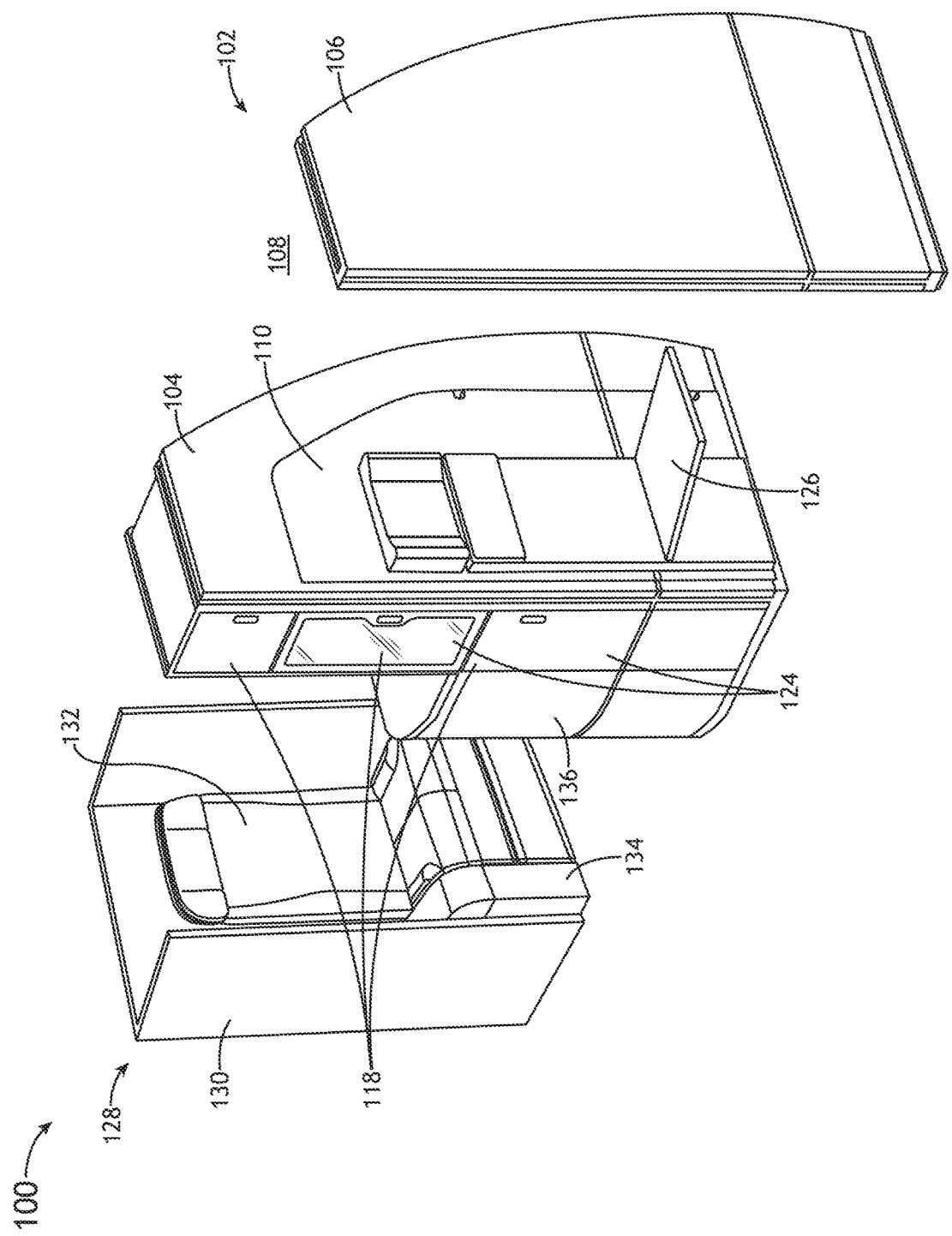
FIG. 1D illustrates a perspective view of an aircraft cabin including a passenger compartment and an aircraft interior structure with actuatable panels including a deployable crew member aircraft seat, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-6D generally illustrate an aircraft interior structure including actuatable panels and a footwell, in accordance with one or more embodiments of the disclosure.

Aircraft cabin designs may include aircraft interior structures that are separately-constructed and separately-installed within the aircraft cabin. For example, the aircraft cabin may include an interior structure with one or more footwells and/or one or more ottomans for business class or first-class passenger compartments. By way of another example, the aircraft cabin may include an interior structure configured to operate as a service area or galley around which crew members may prepare items for passengers, and/or a service or galley stowage area in which crew members may stow or retrieve items.

The separate nature of the aircraft interior structures may result in a loss of valuable space (e.g., floor space, stowage space, or the like) within the aircraft cabin. However, aircraft cabin designs need to address competing interests for increased passenger seating, storage space, lavatories, service areas or galley spaces, and other structures and/or monuments. For example, arranging the layout of an aircraft cabin in order to increase passenger seating may require reducing an amount of room used for storage space, lavatories, service areas or galley spaces, and other structures and/or monuments. For instance, reducing the amount of room used may include modifying the arrangement and/or design of components including, but not limited to, a service area or galley, an aircraft lavatory, or other structures and/or monuments of the aircraft passenger cabin.

When modifying an aircraft cabin design to allow for a more compact arrangement, load-bearing/weight-bearing requirements must be met without losing the intended functionality of the structures and/or monuments in the aircraft cabin. For example, the structures and/or monuments in the aircraft cabin may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

As such, it would be beneficial to provide aircraft interior structures with actuatable panels and a footwell. For example, a footwell may be integrated into a structure or monument of a set of structures or monuments including the service area, the set of structures or monuments to be installed within the aircraft cabin. The integrating of various aircraft interior components may reduce required installation space, resulting in an increase of available floor space for other aircraft interior structures and/or monuments while continuing to meet aviation guidelines and/or standards.

FIGS. 1A-6D in general illustrate an aircraft cabin 100 and an aircraft interior structure 102 configured for the aircraft cabin 100. The aircraft interior structure 102 may be configured as a front row monument for the aircraft cabin 100. It is noted herein, however, that the aircraft interior structure 102 being configured as a front row monument is not limiting, and that the aircraft interior structure 102 may be placed at other locations within the aircraft cabin 100.

Referring now to at least FIGS. 1A-1D, the aircraft interior structure 102 may include a primary monument 104 and an auxiliary monument 106. The primary monument 104 and the auxiliary monument 106 may be separated by a cabin area 108. The aircraft interior structure 102 may include one or more actuatable panels 110. For example, both the primary monument 104 and the auxiliary monument 106 may each include an actuatable panel 110.

As illustrated in a transition between FIGS. 1A, 1B, 1C, and 1D, the one or more actuatable panels 110 may be configured to actuate between a panel open or deployed position and a panel closed or stowed position. For example, the one or more actuatable panels 110 may be in the panel deployed position within at least a portion of the cabin area 108. The actuation of the one or more actuatable panels 110 between the panel deployed position and the panel stowed position may occur via one or more actuation assemblies 112. For example, an actuatable panel 110 may be coupled to the primary monument 104 or the auxiliary monument 106 via the one or more actuation assemblies 112.

In general, the one or more actuation assemblies 112 may include any number of components capable of actuating the one or more actuatable panels 110 between the panel stowed position and the panel deployed position. For example, the one or more actuation assemblies 112 may include a sliding pivot point and linkage assembly. By way of another example, the one or more actuation assemblies 112 may include a partial- or full-length hinge assembly.

The aircraft interior structure 102 may include a service area 114. For example, the service area 114 may be formed from one or more actuatable shelves. The service area 114 may be accessible (e.g., in a service area open or deployed position) when the one or more actuatable panels 110 are in the panel deployed position, and may be folded away (e.g., in a service area closed or stowed position) when the one or more actuatable panels 110 are in the panel stowed position. For example, the actuation of the service area 114 between the service area deployed position and the service area stowed position may be independent of the actuation of the one or more actuatable panels 110 between the panel deployed position and the panel stowed position. By way of another example, the one or more actuation assemblies 112 may include one or more sets of linkages configured to cause the actuation of the service area 114 between the service area deployed position and the service area stowed position to be dependent upon the actuation of the one or more actuation assembles 112.

The service area 114 may form at least a portion of a social area or a crew member preparation area within the aircraft cabin 100 when the service area 114 are in the service area deployed position. For example, the service area 114 may include, but is not limited to, a horizontal or substantially horizontal surface for passenger social area interaction or for crew member preparation. For instance, the service area 112 may include, but is not limited to, a countertop, a work surface, or other surface about which passengers may congregate and/or on which crew members may prepare food, drink, or the like. By way of another example, the service area 114 may include a set of storage areas including, but not limited to, vertical or substantially vertical magazine or personal electronic device holders.

The primary monument 104 and/or the auxiliary monument 106 may include an indent or cut-out 116. The indent or cut-out 116 may face toward the cabin area 108 between the primary monument 104 and the auxiliary monument 106. The indent or cut-out 116 may be configured to receive a corresponding actuatable panel 110 when the corresponding actuatable panel 110 is in the panel stowed position. For example, the indent or cut-out 116 may be configured to receive a portion of the service area 114 coupled to the corresponding actuatable panel 110, and the portion of the service area 114 may be configured to stow within the indent or cut-out 116 when the service area 114 is in the service area stowed position and the corresponding actuatable panel 110 is in the panel stowed position.

It is noted herein, however, the one or more actuatable panels 110 may be configured to rest against a surface of the corresponding primary monument 104 or auxiliary monument 106 instead of within the indent or cut-out 116. Therefore, the above description should not be interpreted as a limitation on the scope of the disclosure but merely an illustration.

The aircraft interior structure 102 may include one or more storage compartments 118. The one or more storage compartments 118 may be positioned proximate to or integrated within the primary monument 104 and/or the auxiliary monument 106 of the aircraft interior structure 102. The one or more storage compartments 118 may be coupled to and/or at least be partially inset in the primary monument 104 and/or the auxiliary monument 106 of the aircraft interior structure 102.

At least some of the one or more storage compartments 118 may include a storage compartment (e.g., a wardrobe) configured to receive long and/or large items (e.g., passenger amenities needing to be hung, carry-on luggage, or the like) that require an increased space and/or that a passenger may prefer to store in a substantially vertical or upright orientation.

At least some of the one or more storage compartments 118 may be configured to receive and hold (e.g., contain, secure, or the like) one or more passenger amenities including, but not limited to, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like.

At least some of the one or more storage compartments 118 may include one or more electronic connections for one or more passenger amenities such as, but not limited to, one or more charging ports, one or more charging cables, or the like.

At least some of the one or more storage compartments 118 may include one or more electronic connections in communication with one or more components of the passenger compartment 128 such as, but not limited to, one or more display device connection ports, one or more display device connection cables, one or more audio output jacks (e.g., headphone jacks), one or more audio input jacks, or the like. At least some of the one or more storage compartments 118 may include one or more safety devices (e.g., air masks, personal floatation devices, or the like).

A cavity 120 may be defined within the one or more storage components 118. One or more shelves 122 may be installed within the cavity 120. At least some of the one or more storage compartments 118 may include a corresponding door 124. For example, a door 124 may be fully-opaque or solid. By way of another example, a door 124 may be at least partially fabricated from a transparent material (e.g., glass, plastic, or the like) or include a patterned or unpatterned set of cut-outs configured or designed to meet aviation guidelines and/or standards.

The cavity 120 of a particular storage compartment 118 may be accessible via one or more of a door 124 corresponding to the particular storage compartment 118 defining the cavity 120 or via the cut-out 116 for a particular actuatable panel 110.

The aircraft interior structure 102 may include one or more crew member aircraft seats 126. The one or more crew member aircraft seats 126 may be coupled to the one or more actuatable panels 110. For example, the one or more crew member aircraft seats 126 may be accessible when the one or more actuatable panels 110 are in the panel stowed position. In this non-limiting example, the one or more crew member aircraft seats 126 may open into the floor area 108 of the aircraft cabin 100.

The one or more crew member aircraft seats 126 may be accessible when the one or more actuatable panels 110 are in the panel stowed position. For example, the one or more crew member aircraft seats 126 may be in a service area open or deployed position or in a crew member aircraft seat closed or stowed position when the one or more actuatable panels 110 are in the panel stowed position. The one or more crew member aircraft seats 126 may be inaccessible (e.g., and in the crew member aircraft seat stowed position) when the one or more actuatable panels 110 are in the panel deployed position.

The aircraft cabin 100 may include one or more passenger compartments 128. The one or more passenger compartments 128 may include a privacy shell 130 with one or more privacy shell elements. The privacy shell 130 may include an opening within the one or more privacy shell elements into the passenger compartment 128, the opening configured to lead to an aircraft aisle of the aircraft cabin 100. The passenger compartment 128 may include a door for the opening. For example, the door may swing or slide into an open position against the one or more privacy shell elements. By way of another example, one or more privacy shell elements may be at least partially hollow, and the door may be slid into a cavity defined in the one or more privacy shell elements.

The one or more passenger compartments 128 may include one or more aircraft seats 132 (e.g., business class or first-class passenger seats) positioned proximate to the aircraft interior structure 102. It is noted herein the terms "aircraft seats" and "passenger seats" may be considered equivalent, for purposes of the disclosure.

The aircraft seat 132 may be rotatable about an axis (e.g., swivelable). The aircraft seat 132 may be fully positionable between the outer limits of motion as defined by the moveable components of the aircraft seat 132 and/or one or more passenger compartment monuments 134 of the passenger compartment 128. It is noted herein an upright or raised position may be considered a taxi, takeoff, or landing (TTOL) position during select stages of flight (though the upright or raised position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 132 may be actuatable (e.g., translatable and/or rotatable) from the TTOL position to a non-TTOL position, and/or vice versa. Further, it is noted herein the aircraft seat 132 may be capable of a fully upright or raised position, and that the TTOL position may have a more reclined seat back cushion and a more angled upward seat pan cushion as compared to the fully upright or raised position. Therefore, the above description should not be interpreted as a limitation on the present disclosure but merely an illustration.

In general, an aircraft seat 132 of the one or more aircraft seats 132 may be translatable (e.g., trackable or slidable). The aircraft seat 132 may be rotatable about an axis crosswise through the aircraft seat 132 into a position including, but not limited to, an upright or raised position, one or more lounge or reclined positions, and a lie-flat or bed position. For example, the aircraft seat 132 may transition directly between the upright position and the lie-flat or bed position. By way of another example, it is noted herein the aircraft seat 132 may transition through one or more reclined positions between the upright position and the lie-flat or bed position. By way of another example, the aircraft seat 132 may transition into one or more reclined positions in a motion separate from the transition between the upright position and the lie-flat or bed position. Therefore, the above description should not be interpreted as a limitation on the scope of the disclosure but merely an illustration.

The aircraft seat 132 may be configured to avoid contact with the one or more passenger compartment monuments 134 when transitioning between positions (e.g., between the upright or raised position and the lie-flat or bed position). The one or more passenger compartment monuments 134 may include or may be implemented as a divider panel or structure separating adjacent passenger compartments 128 and/or between a passenger compartment 128 from an open area within the aircraft cabin 100. For example, where the one or more passenger compartment monuments 134 are implemented as separators, the one or more passenger compartment monuments 134 may be configured to allow for the multiple passenger compartments 128 to be installed within the aircraft cabin 100 in a more compact arrangement. In this regard, the amount of floor area of the aircraft cabin 100 necessary for the one or more aircraft seats 132 may be reduced.

The one or more passenger compartment monuments 134 may include, but are not limited to, a tray or table, a side stand, or the like. The aircraft seat 132 may be configured to avoid contact with the one or more auxiliary monuments when transitioning between positions (e.g., between the upright or raised position and the lie-flat or bed position).

The one or more passenger compartment monuments 134 may include a top surface, a bottom surface, and/or one or more side surfaces. For example, the auxiliary monument may include a single continuous side surface where all corners are rounded. By way of another example, the auxiliary monument may include up to an N number of side surfaces where the auxiliary monument includes up to an N number of corners. The auxiliary monument may be fixed in position. It is noted herein, however, that the auxiliary monument may be actuatable (e.g., may extend a select distance from a stored position to an extended position proximate to a passenger, similar to an aircraft tray table).

A particular passenger compartment 128 may be positioned proximate to the aircraft interior structure 102 within the aircraft cabin 100. For example, the passenger compartment 128 may be positioned proximate to the primary monument 104 of the aircraft interior structure 102. For instance, the passenger compartment 128 may be positioned proximate to a passenger seating section 136 of the primary monument 104.

It is noted herein that at least some components (e.g., at least a portion of the privacy shell 130, a passenger compartment monument 134, the passenger seating section 136, or the like) may conform to a portion of an aircraft seat 132. In this regard, the amount of floor area of the aircraft cabin 100 necessary for the one or more aircraft seats 132 may be reduced.

The aircraft interior structure 102 and/or the one or more passenger compartments 128 may include one or more frames, one or more sub-frames, one or more interior or exterior décor panels, or the like.

It is noted herein that one or more of the aircraft interior structure 102, the passenger compartment 128, one or more components of the aircraft interior structure 102, and/or one or more components of the passenger compartment 128 may be considered components of an aircraft cabin system installed within the aircraft cabin 100.

Figure 2A:
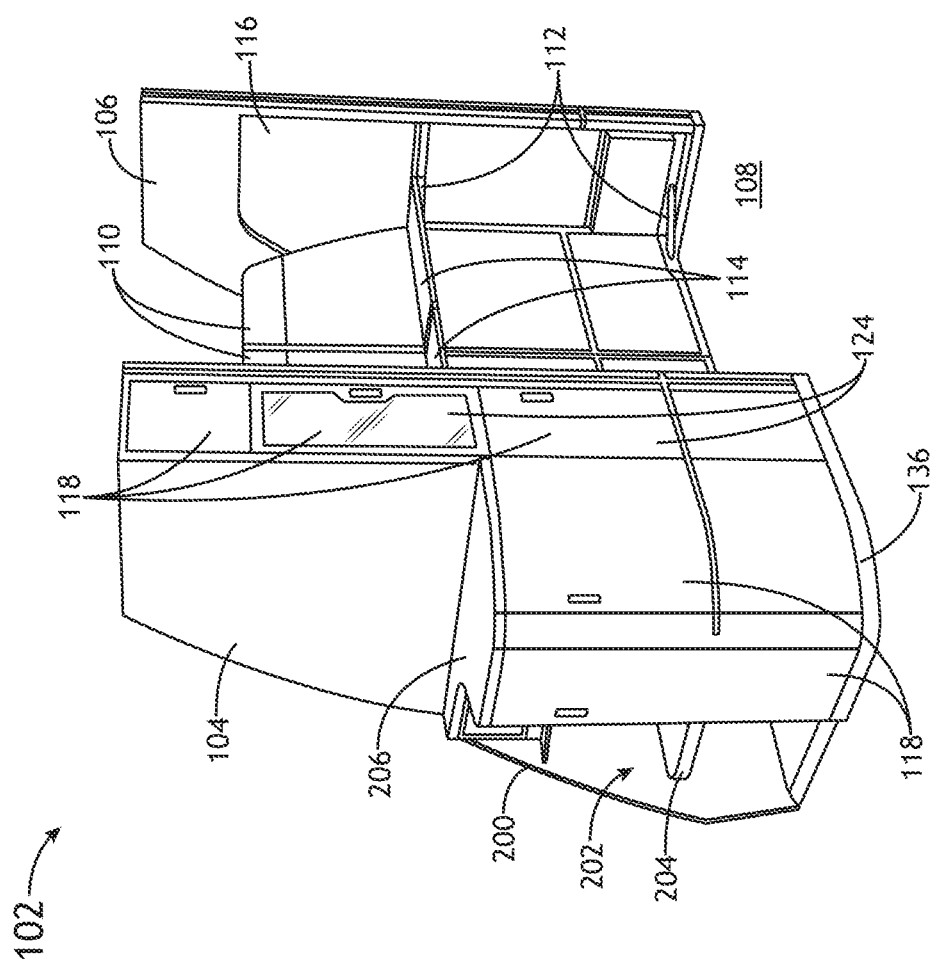
FIG. 2A illustrates a perspective view of an aircraft interior structure with actuatable panels and a footwell, in accordance with one or more embodiments of the disclosure.
Figure 2B:
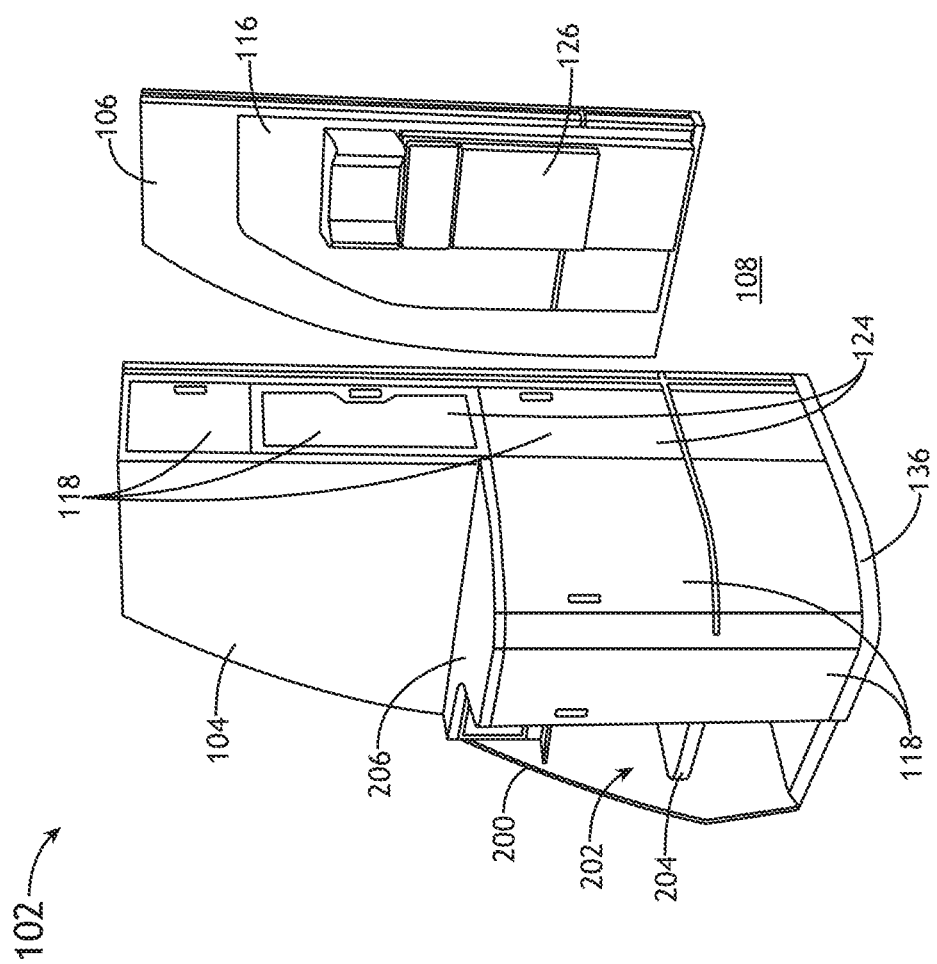
FIG. 2B illustrates a perspective view of an aircraft interior structure with a footwell and actuatable panels including a deployable crew member aircraft seat, in accordance with one or more embodiments of the disclosure.

Referring now to at least FIGS. 2A and 2B, the passenger seating section 136 of the aircraft interior structure 102 may include an opening 200 configured to provide access to one or more footwells 202. The one or more footwells 202 may be configured to be usable by one or more passengers in one or more aircraft seats 132 within a passenger compartment 128 positioned proximate to the aircraft interior structure 102. The passenger seating section 136 may include one or more ottomans 204 positioned within the one or more footwells 202. For example, the one or more ottomans 204 may be fixed in place. By way of another example, the one or more ottomans 204 may be configured to transition between a first position and at least a second position. For instance, at least a portion of an ottoman 204 may be configured to translate, may be configured to rotate about an axis, or may be configured to translate and rotate about an axis.

An ottoman 204 may be usable by a passenger in an aircraft seat 132 positioned proximate to the aircraft interior structure 102 when the corresponding aircraft seat 132 is in a lie-flat or bed position. For example, the ottoman 204 may form a portion of a bed surface when the corresponding aircraft seat 132 is in the lie-flat or bed position. The ottoman 204 may be usable by a passenger in an aircraft seat 132 positioned proximate to the aircraft interior structure 102 when the corresponding aircraft seat 132 is in a reclined or lounge position.

The ottoman 204 may be positioned within a footwell 202 of the passenger seating section 130. For instance, one or more dimensions of the footwell 202 may be changed by transitioning the aircraft seat 132 between the upright or raised position, a lounge or reclined position, and the lie-flat or bed position. It is noted herein that a portion of the ottoman 204 may be actuatable (e.g., along a set of tracks or linear rails) to a position outside of the footwell 202.

The ottoman 204 may be configured to translate and/or rotate about an axis through a sidewall of the ottoman 204 to point a top surface to a passenger occupying the aircraft seat 132. For example, where the ottoman 204 may be configured to both translate and rotate, the ottoman 204 may be configured to independently rotate and/or translate. By way of another example, where the ottoman 204 may be configured to both translate and rotate, a rotation may prevent further translation until the ottoman 204 is returned to a select position and/or a translation may prevent further rotation until the ottoman 204 is returned to a select position.

It is noted herein, however, the aircraft seat 132 and/or the ottoman 204 may be limited to an upright or raised position and/or one or more lounge or reclined positions. In addition, it is noted herein the aircraft seat 132 may be the sole component forming a bed when the aircraft seat 132 is in a lie-flat or bed position. Therefore, the above description should not be interpreted as a limitation on the present disclosure but merely an illustration.

One or more storage compartments 118 may be positioned proximate to or integrated within one or more privacy shell elements of the privacy shell 130, the one or more passenger compartment monuments 134, the passenger seating section 136, or the like. One or more storage compartments 118 may be coupled to and/or at least be partially inset in the privacy shell 130, the one or more passenger compartment monuments 134, the passenger seating section 136, or the like.

The passenger seating section 136 may include one or more work surfaces 206. For example, the one or more work surfaces 206 may be horizontal or substantially horizontal. The one or more work surfaces 206 may be positioned above the one or more footwells 202, the one or more ottomans 204, and/or the one or more storage compartments 118.

Figure 3A:
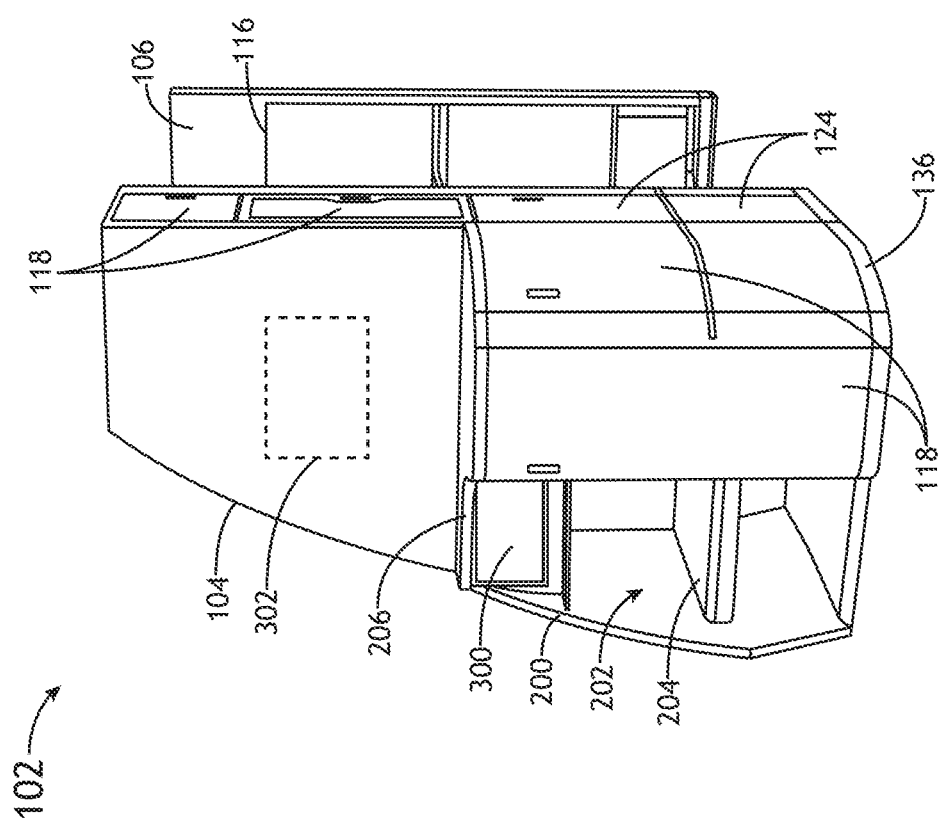
FIG. 3A illustrates a perspective view of an aircraft interior structure with actuatable panels and a footwell, in accordance with one or more embodiments of the disclosure.
Figure 3B:
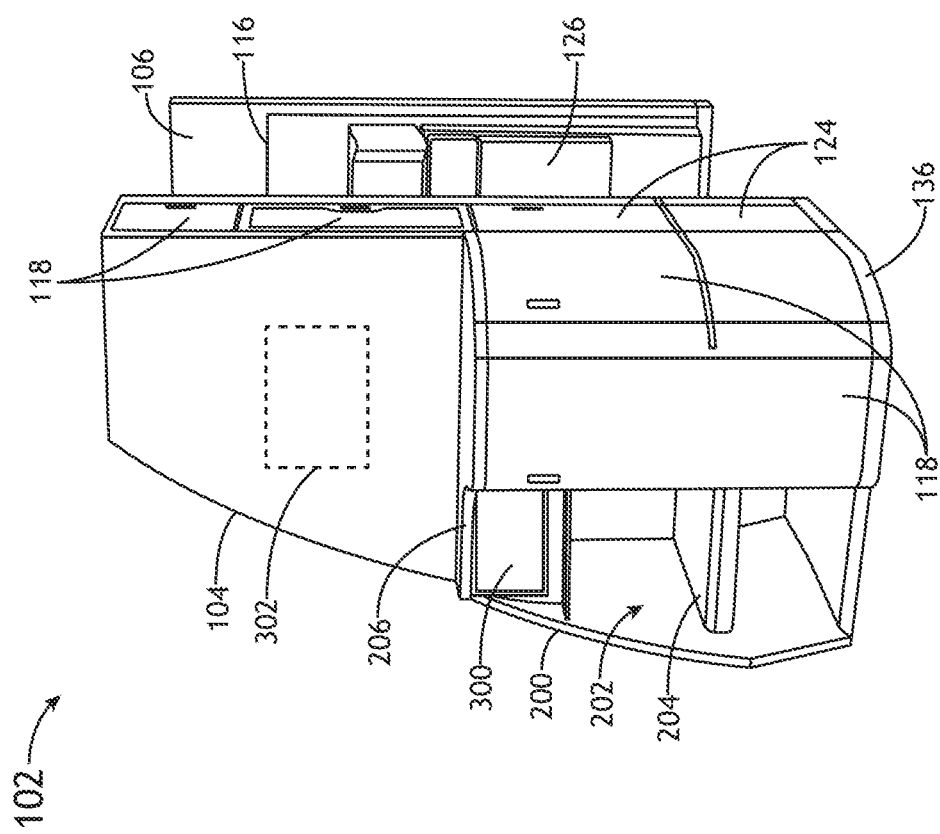
FIG. 3B illustrates a perspective view of an aircraft interior structure with a footwell and actuatable panels including a deployable crew member aircraft seat, in accordance with one or more embodiments of the disclosure.

Referring now to at least FIGS. 3A and 3B, the aircraft interior structure 102 may include one or more accessories 300. For example, the one or more accessories 300 may be installed proximate to the footwell 202 of the passenger seating section 136. By way of another example, the one or more accessories 300 may be positioned proximate to or integrated within a surface 302 above the passenger seating section 136. For instance, the surface 302 may be a surface of the primary monument 104 facing the passenger compartment 128. By way of another example, the one or more accessories 300 may be coupled to and/or at least be partially inset within the surface 302 above the passenger seating section 136.

The one or more accessories 300 may be configured to provide a visual and/or auditory output. For example, the one or more accessories 300 may include one or more electronics or electronic devices. For instance, the one or more accessories 300 may include, but are not limited to, one or more lights or lighted panels, one or more in-flight entertainment (IFE) devices, one or more speakers configured to provide media content separate from or accompanying the media content shown on the in-flight entertainment (IFE) devices, or the like.

It is noted herein the one or more passenger compartments 128 may include electronics or electronic devices including, but not limited to, one or more aircraft seat 132 actuation devices (e.g., assemblies, controls, actuators, and/or the like), one or more air flow or temperature control devices, or the like.

Figure 4A:
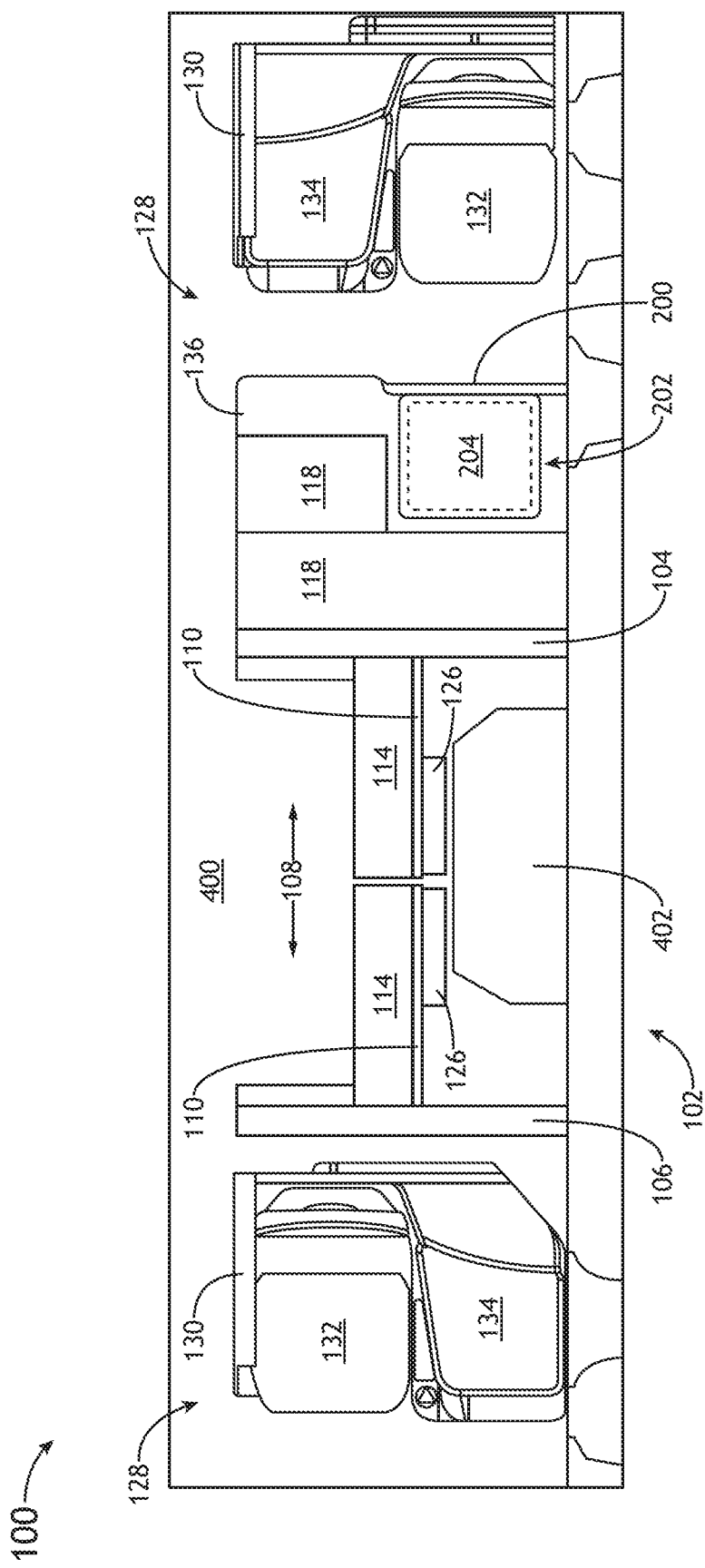
FIG. 4A illustrates a plan view of an aircraft cabin including a passenger compartment and an aircraft interior structure with a footwell and actuatable panels including deployable crew member aircraft seats, in accordance with one or more embodiments of the disclosure.
Figure 4B:
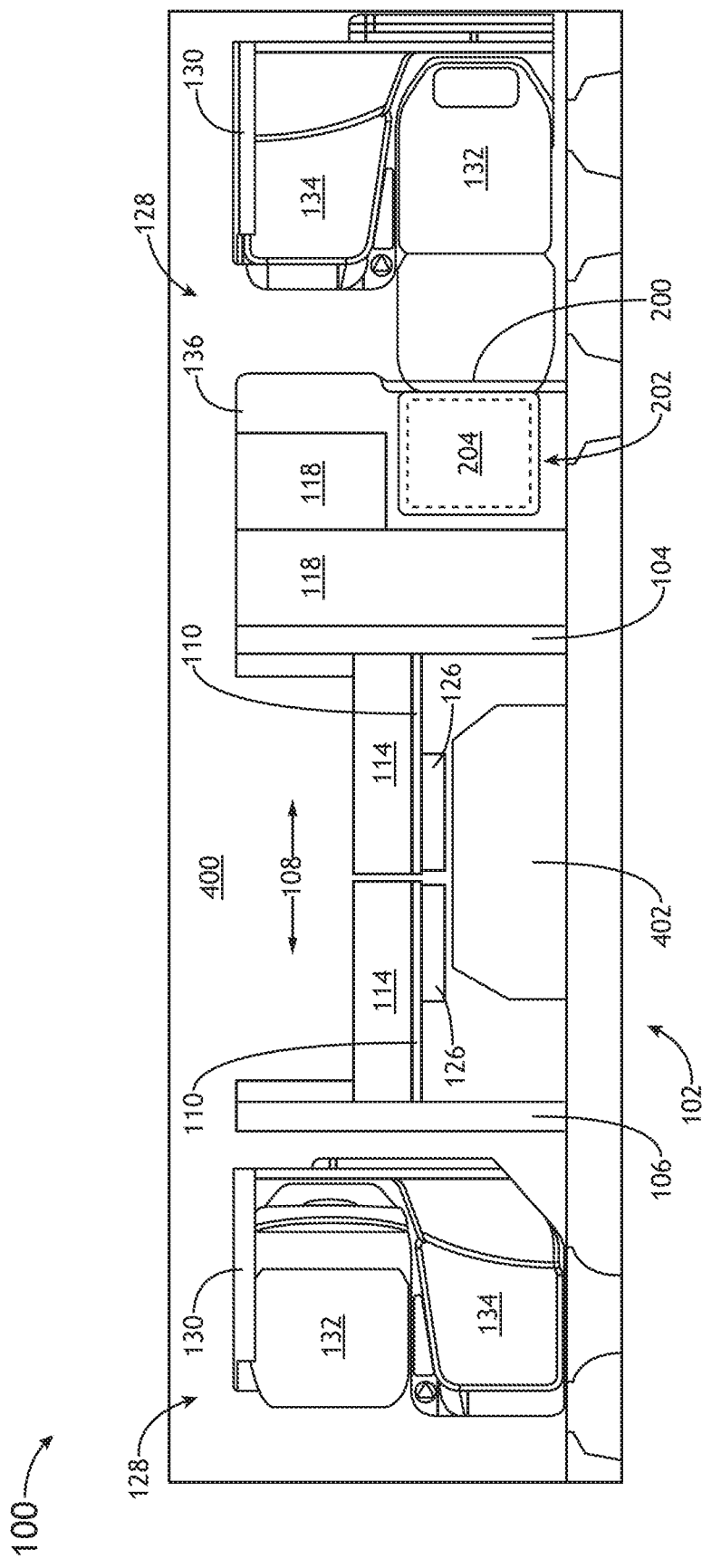
FIG. 4B illustrates a plan view of an aircraft cabin including a passenger compartment and an aircraft interior structure with a footwell and actuatable panels including deployable crew member aircraft seats, in accordance with one or more embodiments of the disclosure.

Referring now to at least FIGS. 4A and 4B, the aircraft cabin 100 may include an aircraft aisle 400. The aircraft aisle 400 may provide access to the floor area 108 separating the primary monument 104 and the auxiliary monument 106. The aircraft aisle 400 may provide access to the one or more passenger compartments 128.

When the one or more actuatable panels are in the panel stowed position, the floor area 108 may provide access to an egress point 402 of the aircraft cabin 100 (e.g., a fuselage door, or the like). For example, the aircraft interior structure 102 may be proximate to the egress point 402. For example, the primary monument 104 and the auxiliary monument 106 may flank the egress point 402, such that the floor area 108 leads to the egress point 402. It is noted herein, however, that the aircraft interior structure 102 being proximate to the egress point 402 of the aircraft cabin 100 is not limiting, and that the aircraft interior structure 102 may be placed at other locations within the aircraft cabin 100.

Although embodiments of the disclosure illustrate a surface of the auxiliary monument 106 not facing the floor area 108 as being unused, it is noted herein that one or more crew member aircraft seats 126 may be coupled to the surface. In addition, the auxiliary monument 106 may form a portion of a privacy shell 130 of a passenger compartment 128, such that the surface not facing the floor area 108 may be inside the passenger compartment 128 and proximate to an aircraft seat 132 of the passenger compartment 128.

Figure 5A:
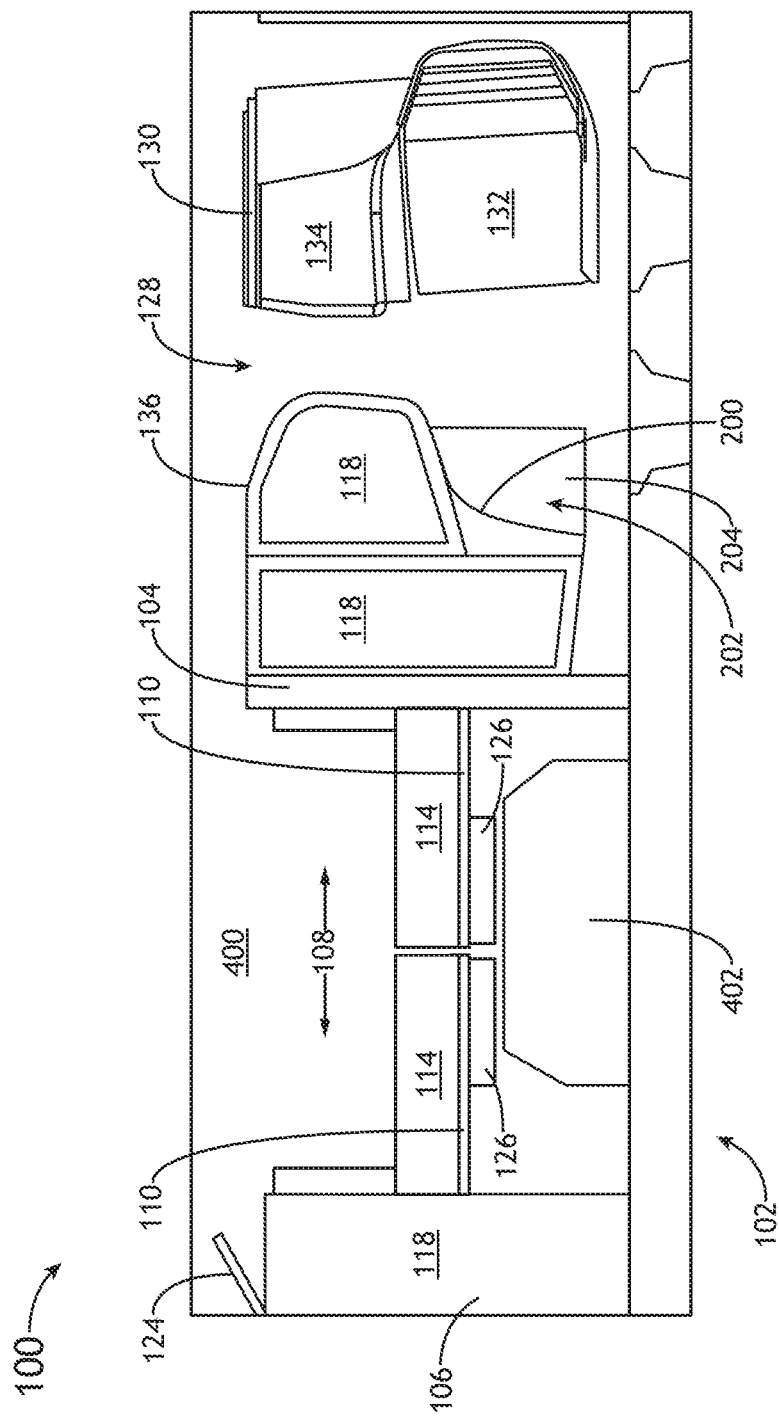
FIG. 5A illustrates a plan view of an aircraft cabin including a passenger compartment and an aircraft interior structure with a footwell and actuatable panels including deployable crew member aircraft seats, in accordance with one or more embodiments of the disclosure.
Figure 5B:
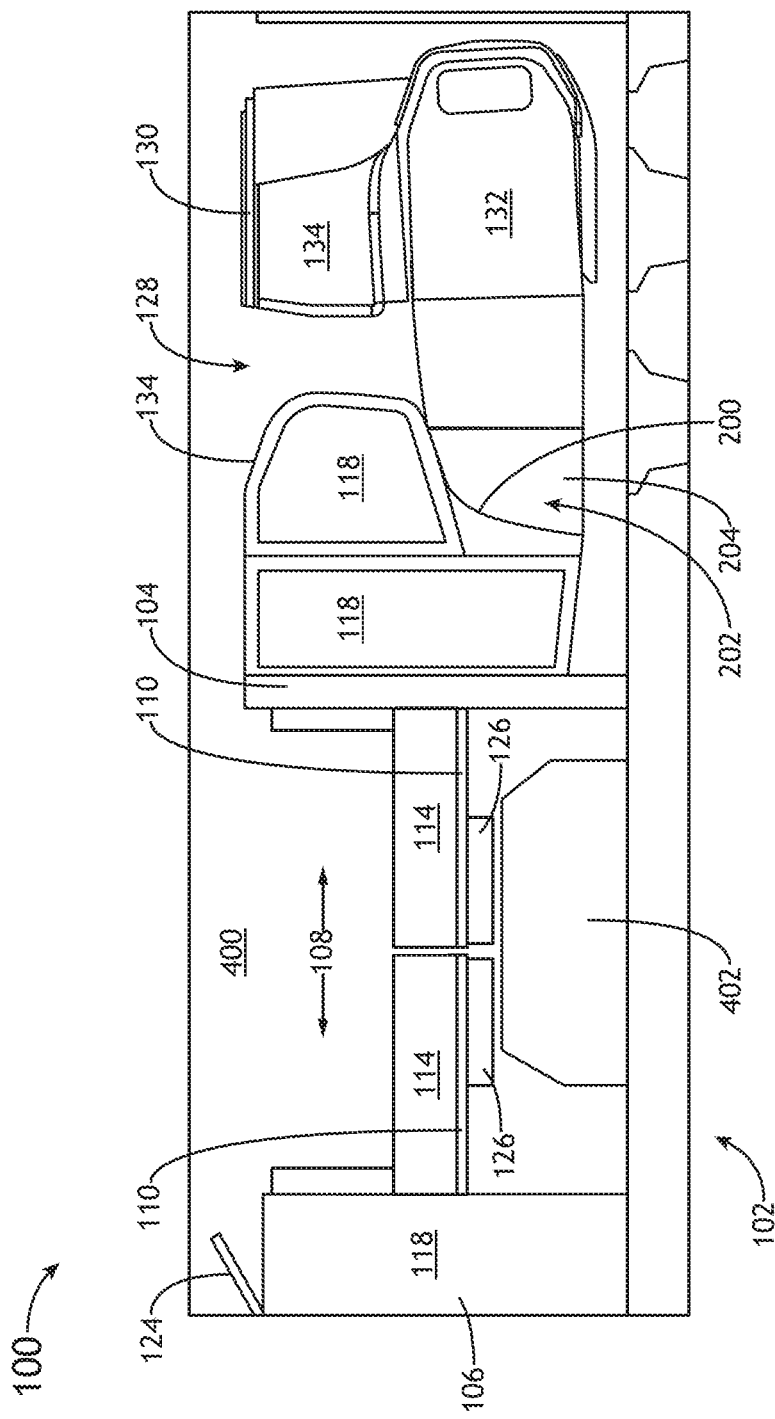
FIG. 5B illustrates a plan view of an aircraft cabin including a passenger compartment and an aircraft interior structure with a footwell and actuatable panels including deployable crew member aircraft seats, in accordance with one or more embodiments of the disclosure.

Referring now to at least FIGS. 5A and 5B, it is noted herein the auxiliary monument 106 may include functionality in addition to being installed as a divider within the aircraft cabin 100. For example, the auxiliary monument 106 may include one or more storage compartments 118.

As illustrated in at least FIGS. 4A-5B, the one or more storage compartments 118 may be accessible from multiple directions. For example, the one or more storage compartments 118 may be accessible via the aircraft aisle 400. By way of another example, the one or more storage compartments 118 may be accessible via the floor area 108. By way of another example, the one or more storage compartments 118 may be accessible via the passenger compartment 128.

As illustrated in at least FIGS. 4A-5B, the footwell 202 and the one or more storage compartments 118 may at least partially overlap such that an amount of space originally designated for the one or more storage compartments 118 is instead re-purposed for the footwell 202. The one or more footwells 202 (and the one or more ottomans 204) may breach a vertical or substantially-vertical plane defined by the one or more storage compartments 118. The one or more footwells 202 may be configured to fit within a space at least partially defined by a depth of the one or more storage compartments.

By breaching the vertical or substantially-vertical plane, at least a portion of the one or more footwells 202 (and the one or more ottomans 204) may be at least partially set an amount of space reserved for the one or more storage compartments 118. For example, the one or more footwells 202 may be partially surrounded by the one or more storage compartments 118. For instance, the one or more footwells 202 may form a rear surface or side surface of the one or more storage compartments 118. In addition, the one or more footwells 202 may be at least partially surrounded by the one or more storage compartments 118. In addition, by breaching the vertical or substantially-vertical plane, at least a portion of the one or more footwells 202 (and the one or more ottomans 204) may extend beyond the passenger seating section 136 (e.g., where defined by a depth of the work surface 206).

In this regard, at least a portion of the passenger seating section 136 may be considered integrated within the aircraft interior structure 102, as the aircraft interior structure 102 includes the one or more storage compartments 118 and at least a portion of the one or more footwells 202. In addition, at least a portion of the one or more footwells 202 may be considered integrated within the aircraft interior structure 102, as the one or more footwells 202 may be positioned within the aircraft interior structure 102 proximate to the one or more storage compartments 118. It is noted herein that integrating the passenger seating section 136 with the one or more storage compartments 118 may reduce the combined area required for the footprints of the passenger seating section 136 and the aircraft interior structure 102, as compared to if the sections were separately-constructed for and/or separately-installed within the aircraft cabin 100. The aircraft interior structure 102 may then be installed at locations within an aircraft cabin 100 to allow for additional improvement in the monument or structure layout within the aircraft cabin 100 (e.g., additional stowage, an additional row of passenger compartments 128 and/or aircraft seats 132, or the like). Marketable volume of the aircraft interior structure 102 may be maintained, while the available floor space within the aircraft cabin 100 may be increased (e.g., for additional monuments, structures, passenger compartment being installed, or the like).

Although embodiments of the disclosure illustrate the aircraft interior structure 102 as including the primary monument 104 with a primary panel 110 and the auxiliary monument 106 with an auxiliary panel 110, it is noted herein the spacing of the floor area 108 may be such that the aircraft interior structure 102 includes only a single panel 110. For example, the primary monument 104 may include a single panel 110 configured to span the some or all of a width of the floor area 108 between the primary monument 104 and the auxiliary monument 106. Therefore, the above description should not be interpreted as a limitation on the present disclosure but merely an illustration.

Although embodiments of the disclosure illustrate the aircraft interior structure 102 as including the primary monument 104 and the auxiliary monument 106, it is noted herein the aircraft interior structure 102 may only include the primary monument 104 (e.g., where dimensions of the aircraft cabin 100 require a smaller-footprint aircraft interior structure 102, where the auxiliary monument 106 is a separate and/or standalone monument within the aircraft cabin 100, or the like). Therefore, the above description should not be interpreted as a limitation on the present disclosure but merely an illustration.

Referring now to at least FIGS. 6A-6D, although embodiments of the disclosure illustrate the passenger seating section 136 being integrated with the aircraft interior structure 102 (e.g., integrated with the primary monument 104 of the aircraft interior structure 102), it is noted herein the passenger seating section 136 may be a portion of a separate component coupled to the aircraft interior structure 102.

The aircraft cabin 100 may include a façade 600. The façade 600 may include a backplate 602. The passenger seating section 136 including, but not limited to, the one or more footwells 202 (and the one or more ottomans 204), the one or more storage compartments 118, the one or more work surfaces 206, and/or the one or more accessories 300 may be coupled to or integrated with the backplate 602. It is noted herein the surface 302 may be a surface of the backplate 602 facing the passenger compartment 128, instead of a surface of the primary monument 104.

The façade 600 may be coupled to a surface 604 of the primary monument 104 defining a vertical or substantially-vertical plane and facing the one or more passenger compartments 128 via one or more mount points 606. The surface 604 may include a cavity or cut-out 608.

The façade 600 may be full-height or a partial-height as compared to a height of the primary monument 104. Where the façade 600 is a partial height, a portion of the aircraft interior structure 102 corresponding to a remainder or excess height may include interior or exterior décor panels, shelving units without doors, storage compartments with doors, and/or accessories proximate to the passenger seating section 136.

As illustrated in FIG. 6C, an extended portion 610 of the façade 600 corresponding to the footwell 202 may extend from the façade 600 and be insertable into the cavity or cut-out 608, such that the cavity or cut-out 608 may be configured to receive the footwell portion of the auxiliary aircraft interior structure 156 to accommodate the extended portion 610. As such, the extended portion 610 may extend beyond the vertical or substantially-vertical plane defined by the surface 604 of the primary monument 104 (or defined by a surface of the backplate 602 configured to be proximate to the surface 604). It is noted herein, however, the façade 600 may not have the extended portion 610 extended from the façade 600, such that the surface configured to be proximate to the surface 604 of the primary monument 104 may be within a single plane or substantially with the single plane.

As illustrated in FIG. 6D, in an alternative embodiment the façade 600 may not include the footwell 202 (and the ottoman 204), but include only the opening 200. Here, the cavity or cut-out 608 within the primary monument 104 may be accessible via the opening 200 within the façade 600, such that the cavity or cut-out 608 is configured to operate as the footwell 202.

Although embodiments of the disclosure illustrate the façade 600 as including the backplate 602 to which the passenger seating section 136 may be coupled, it is noted herein the façade 600 may not include the backplate 602 and the passenger seating section 136 may directly couple to the surface 604 of the aircraft interior structure via the one or more mount points 606. Therefore, the above description should not be interpreted as a limitation on the present disclosure but merely an illustration.

It is noted herein the façade 600 may not include the footwell 204, but may instead include one or more service areas, one or more storage compartments, or the like. It is noted herein the surface of the auxiliary monument 106 not facing the floor area 108 may include one or more mount points 606 for a façade 600.

Although embodiments of the disclosure are directed to an aviation environment such as an aircraft cabin 100, it is noted herein the aircraft interior structure 102 including the one or more actuatable panels 110 and the footwell 202 is not limited to the aviation environment and/or the aircraft components within the aviation environment. For example, the aircraft interior structure 102 including the one or more actuatable panels 110 and the footwell 202 may be configured for any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. By way of another example, the aircraft interior structure 102 including the one or more actuatable panels 110 and the footwell 202 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft interior structure, comprising:
a primary monument, the primary monument including a primary panel and one or more storage compartments, the primary panel being configured to actuate between a primary panel stowed position and a primary panel deployed position, the primary panel positioned within at least a portion of a floor area of an aircraft cabin when in the primary panel deployed position;
an auxiliary monument spaced a select distance from the primary monument across the floor area of the aircraft cabin, the auxiliary monument including an auxiliary panel, the auxiliary panel being configured to actuate between an auxiliary panel stowed position and an auxiliary panel deployed position, the auxiliary panel positioned within at least a portion of the floor area of the aircraft cabin when in the auxiliary panel deployed position,
  the at least a portion of the floor area where the primary panel is positioned when in the primary panel deployed position being positioned between the primary monument and the auxiliary monument, the at least a portion of the floor area where the auxiliary panel is positioned when in the auxiliary panel deployed position being positioned between the primary monument and the auxiliary monument,
  the primary panel and the auxiliary panel forming a substantially-vertical surface when in the primary panel deployed position and the auxiliary panel deployed position, the substantially-vertical surface being perpendicular to a surface of the primary monument and a surface of the auxiliary monument when in the primary panel deployed position and the auxiliary panel deployed position, the substantially-vertical surface positioned within the at least a portion of the floor area where the primary panel and the auxiliary panel are positioned when in the primary panel deployed position and the auxiliary panel deployed position; and
a passenger seating section proximate to a passenger compartment, the passenger seating section including a footwell, the footwell being at least partially within the primary monument and proximate to the one or more storage compartments, the footwell corresponding to an aircraft seat within the passenger compartment, the aircraft seat being configured to form a bed surface when the aircraft seat is in a lie-flat position, at least a portion of the bed surface being within the footwell when the aircraft seat is in the lie-flat position, and the at least the portion of the bed surface being outside the footwell when the aircraft seat is in an upright position,
at least a portion of the primary monument and at least a portion of the auxiliary monument being non-movable.

2. The aircraft interior structure of claim 1, further comprising:
a service area formed from at least one actuatable shelf, the at least one actuatable shelf being coupled at least one of the primary panel or the auxiliary panel, the service area being configured to actuate between a service area stowed position and a service area deployed position.

3. The aircraft interior structure of claim 2, the at least one actuatable shelf including a primary shelf coupled to the primary panel and an auxiliary shelf coupled to an auxiliary panel, the service area being in the service area stowed position when the primary panel is in the primary panel stowed position and the auxiliary panel is in the auxiliary panel stowed position.

4. The aircraft interior structure of claim 1, further comprising:
at least one crew member aircraft seat coupled to at least one of the primary panel or the auxiliary panel, the at least one crew member aircraft seat being configured to actuate between a crew member aircraft seat stowed position and a crew member aircraft seat deployed position.

5. The aircraft interior structure of claim 4, the at least one crew member aircraft seat including a primary crew member aircraft seat coupled to the primary panel and an auxiliary crew member aircraft seat coupled to the auxiliary panel,
  the primary crew member aircraft seat and the auxiliary crew member aircraft seat being accessible when the primary panel is in the primary panel stowed position and the auxiliary panel is in the auxiliary panel stowed position,
  the primary crew member aircraft seat and the auxiliary crew member aircraft seat being inaccessible when the primary panel is in the primary panel deployed position and the auxiliary panel is in the auxiliary panel deployed position.

6. The aircraft interior structure of claim 5, the primary crew member aircraft seat and the auxiliary crew member aircraft seat being actuatable between the crew member aircraft seat stowed position and a crew member aircraft seat deployed position when the primary panel is in the primary panel stowed position and the auxiliary panel is in the auxiliary panel stowed position.

7. The aircraft interior structure of claim 1, the auxiliary panel being configured to be in the auxiliary panel stowed position when the primary panel is in the primary panel stowed position, the auxiliary panel being configured to be in the auxiliary panel deployed position when the primary panel is in the primary panel deployed position.

8. The aircraft interior structure of claim 1, the footwell being configured to fit in a space within the primary monument at least partially defined by a depth of the one or more storage compartments.

9. The aircraft interior structure of claim 1, the primary monument and the auxiliary monument being separated by a floor area within an aircraft cabin including the aircraft interior structure.

10. The aircraft interior structure of claim 9, the one or more storage compartments being accessible from at least one of the floor area of the aircraft cabin when the primary panel is in the primary deployed position or an aircraft aisle of the aircraft cabin.

11. The aircraft interior structure of claim 10, the floor area leading to an egress point of the aircraft cabin, the primary monument and the auxiliary monument flanking the egress point of the aircraft cabin, the primary panel and the auxiliary panel providing access to the egress point when the primary panel is in the primary panel stowed position and the auxiliary panel is in the auxiliary panel stowed position.

12. The aircraft interior structure of claim 1, the passenger seating section including an ottoman within the footwell, the ottoman corresponding to the aircraft seat within the passenger compartment, the ottoman and the aircraft seat are configured to form the bed surface when the aircraft seat is in the lie-flat position.

13. An aircraft interior structure, comprising:

a primary monument, the primary monument including a primary panel and one or more storage compartments, the primary panel being configured to actuate between a primary panel stowed position and a primary panel deployed position, the primary panel positioned within at least a portion of a floor area of an aircraft cabin when in the primary panel deployed position;

an auxiliary monument spaced a select distance from the primary monument across the floor area of the aircraft cabin, the auxiliary monument including an auxiliary panel, the auxiliary panel being configured to actuate between an auxiliary panel stowed position and an auxiliary panel deployed position, the auxiliary panel positioned within at least a portion of the floor area of the aircraft cabin when in the auxiliary panel deployed position, the at least a portion of the floor area where the primary panel is positioned when in the primary panel deployed position being positioned between the primary monument and the auxiliary monument, the at least a portion of the floor area where the auxiliary panel is positioned when in the auxiliary panel deployed position being positioned between the primary monument and the auxiliary monument, the primary panel and the auxiliary panel forming a substantially-vertical surface when in the primary panel deployed position and the auxiliary panel deployed position, the substantially-vertical surface being perpendicular to a surface of the primary monument and a surface of the auxiliary monument when in the primary panel deployed position and the auxiliary panel deployed position, the substantially-vertical surface positioned within the at least a portion of the floor area where the primary panel and the auxiliary panel are positioned when in the primary panel deployed position and the auxiliary panel deployed position; and a façade including a passenger seating section proximate to a passenger compartment, the façade being couplable to a surface of the primary monument facing the passenger compartment, the passenger seating section including an opening configured to provide access to a footwell, the footwell being at least partially within the primary monument and proximate to the one or more storage compartments, the footwell corresponding to an aircraft seat within the passenger compartment, the aircraft seat being configured to form a bed surface when the aircraft seat is in a lie-flat position, at least a portion of the bed surface being within the footwell when the aircraft seat is in the lie-flat position, and the at least the portion of the bed surface being outside the footwell when the aircraft seat is in an upright position, at least a portion of the primary monument and at least a portion of the auxiliary monument being non-movable.

14. The aircraft interior structure of claim 13, the façade including the footwell and the opening configured to provide access to the footwell, the surface of the primary monument including a cavity configured to receive an extended portion of the façade corresponding to the footwell.

15. The aircraft interior structure of claim 13, the façade including the opening configured to provide access to the footwell, the surface of the primary monument including a cavity configured to operate as the footwell.

\* \* \* \* \*